United States Patent [19]

Davis

[11] Patent Number: 5,293,021

[45] Date of Patent: Mar. 8, 1994

[54] EGG POACHER FOR MICROWAVE OVEN

[75] Inventor: John E. Davis, Melbourne, Australia

[73] Assignee: Tasman Manor Pty. Ltd., South Melbourne, Australia

[21] Appl. No.: 955,893

[22] PCT Filed: Aug. 3, 1992

[86] PCT No.: PCT/AU92/00399

§ 371 Date: Dec. 14, 1992

§ 102(e) Date: Dec. 14, 1992

[30] Foreign Application Priority Data

Aug. 2, 1991 [AU] Australia .............. PK 7558

[51] Int. Cl.$^5$ .............................................. H05B 6/80
[52] U.S. Cl. ................................ 219/728; 219/734; 99/DIG. 14; 99/440; 220/506
[58] Field of Search ............... 219/10.55 E, 10.55 F, 219/10.55 R; 99/DIG. 14, 451, 440, 442, 426, 428; 220/506; 426/243

[56] References Cited

U.S. PATENT DOCUMENTS

| | | |
|---|---|---|
| 1,900,761 | 5/1933 | Proteau . |
| 1,925,700 | 9/1933 | Matter . |
| 2,545,308 | 3/1951 | Ritchie . |
| 2,666,551 | 1/1954 | Wyman . |
| 3,369,480 | 2/1968 | Dreyfus . |
| 3,704,663 | 12/1972 | Shull et al. . |
| 3,831,508 | 8/1974 | Wallard . |
| 4,133,996 | 1/1979 | Fread ............ 219/10.55 E |
| 4,143,647 | 3/1979 | Husslein et al. . |
| 4,280,032 | 7/1981 | Levinson ......... 219/10.55 E |
| 4,337,116 | 6/1982 | Foster et al. . |
| 4,395,015 | 7/1983 | Reardon ............... 99/428 |
| 4,413,167 | 11/1983 | Martel et al. ........ 219/10.55 E |
| 4,501,946 | 2/1985 | Nibbe et al,. ........ 219/10.55 E |
| 4,617,860 | 10/1986 | Blaylock . |
| 4,798,133 | 1/1989 | Johnson . |
| 4,859,822 | 8/1989 | Ragusa et al. . |
| 4,908,487 | 3/1990 | Sarnoff et al. ....... 219/10.55 E |
| 5,094,706 | 3/1992 | Howe . |
| 5,117,078 | 5/1992 | Beckett ............ 219/10.55 F |

FOREIGN PATENT DOCUMENTS

| | | |
|---|---|---|
| 0175462 | 3/1986 | European Pat. Off. . |
| 327659 | 8/1989 | European Pat. Off. ..... 219/10.55 E |

OTHER PUBLICATIONS

Patent Abstracts of Japan, C659, p. 72, JP 1-218416(A), Aug. 31, 1989.

Patent Abstracts of Japan, C722, p. 146, JP 2-68015(A), Mar. 7, 1990.

*Primary Examiner*—Philip H. Leung
*Attorney, Agent, or Firm*—Sterne, Kessler, Goldstein & Fox

[57] ABSTRACT

A utensil for microwave cooking for eggs includes a container body of microwave transmisable material having a side wall merging with a base. The base includes a centrally located yolk retention portion and forms with the side wall a white retention portion. The form and relative disposition of the base and side wall are such that substantially all microwave radiation first entering the yolk after passage through the egg white will previously have passed through the side wall or base.

9 Claims, 1 Drawing Sheet

EGG POACHER FOR MICROWAVE OVEN

This invention relates to a utensil for use in poaching eggs in a microwave oven.

The desirability of utilising the speed and convenience of a microwave oven to produce cooked eggs which have been poached or otherwise cooked to approximate the appearance, taste and texture of a poached egg, has been recognised for some time.

Prior utensils proposed for this purpose have generally recommended the addition of a small quantity of water with the egg to be cooked. The container for the egg to be cooked has been formed of microwave compatible material and has had a flat or concave base. In some of the prior art utensils, no particular thought appears to have been given, or design parameters used, to adapt conventional egg poaching containers for microwave cooking.

One prior specification which does purport to have been specifically designed for microwave cooking is described in U.S. Pat. No. 4,908,487. In this specification the egg compartment is sized and shaped so as to arrange an egg white thinly around the yolk of an egg. This disposition of the white relative to the yolk is, we assume, intended to compensate for the observed fact that the yolk absorbs more energy and thus heats more quickly than the surrounding egg white. The container is thus designed to spread the egg white more thinly than the egg yolk so that the relatively greater exposure of the white to the microwave energy will compensate for the greater energy absorption of the yolk.

We have found however that egg poaching utensils having a concave base to the egg compartment as suggested in U.S. Pat. No. 4,908,487, still tend to produce cooked eggs in which the yolk is set before the white of the egg. Due to the concave shape of the container there is effectively no white around a substantial portion (the bottom) of the egg yolk, thus presenting the yolk directly to the microwaves. Accordingly the yolk still sets considerably earlier than the white. Consequently, eggs cooked in such utensils until the majority of the egg white has set have yolk portions which, to the taste of many people, are overcooked.

It is an object of the present invention to provide an improved egg poaching utensil which enables the user to produce a microwave cooked egg having both yolk and white of the desired consistency.

We have now found that if the egg yolk can be centralised in the base of the egg container, and the container formed so that substantially all the microwave energy which first enters the yolk after passage through the egg white will previously have passed through the sides or base of the container, the cooking of the yolk can be delayed relative to the cooking of the egg white.

Accordingly, the present invention provides a utensil for microwave cooking of eggs which includes at least one container body of microwave transmisible material forming a single compartment and including a side wall merging with a base for the container body, said side wall being of sufficient height to restrain and mould a single shelled egg, the base including a centrally located yolk retention portion and forming with the side wall a white retention portion, at least part of the base being adapted to support the utensil by resting on a flat surface, characterised in that the form and relative disposition of the base and side wall are such that substantially all microwave radiation which in use first enters the yolk of an egg in the container body after passage through the egg white will previously have passed through the side wall or base. A utensil made in accordance with the present invention for microwave cooking of eggs in which the utensil includes at least one container body forming a single compartment which is of such a size to hold one shelled egg only. The container body includes at least one side wall which may be a single continuous wall or a plurality of adjacent merging walls. Preferably a single continuous substantially circular wall is provided. The side wall or walls merge with a base for the container body. The side wall and base may merge in a continuous smooth curve or an angle may be formed between the side wall and the base. The side wall is formed to be of a sufficient height so as to restrain and mould a single egg broken from its shell into the container body.

In accordance with the present invention, the base of the container body includes a centrally located yolk retention portion and, with the side walls of the container body, forms a white retention portion which surrounds the yolk retention portion. The yolk retention portion is preferably defined by at least one projection from the base. The or each projection is of sufficient height above the remainder of the base to restrain the yolk within the yolk retention portion without substantially separating it from the egg white. Preferably the projection height is not greater than three eighths of the height of the yolk from the lowest portion of the yolk within the yolk retention portion.

The or each projection may simply be a ridge projecting above a substantially flat remainder of the base. Alternatively, the or each projection may be an upwardly projecting fold in the base with the remainder of the base being either substantially flat or curved. The base portion within the projection(s) may form a concave yolk retention portion. The base portion outside the projection(s) may form a dished annular portion to hold the egg white.

The yolk retention portion is preferably circular in form. However, the projection(s) may be arranged to form a substantially square, substantially triangular, or other polygonal boundary for the yolk retention portion, provided the yolk retaining function is retained.

A single continuous projection is preferred but two or more spaced projections can be arranged and spaced so as to retain the egg yolk. The retention of the egg yolk within the yolk retention portion of the base is, of course, assisted by the membrane separating the yolk from the egg white.

In this regard, the yolk retention portion may be formed simply by a substantially flat central portion of the base. The remainder of the base or the side walls of the container body extend upwardly from this flat central portion. In this embodiment, the yolk is retained in the yolk retention portion because it sinks to the lowest portion of the container body and is retained there by its greater density than the egg white and by the membrane separating it from the egg white.

In accordance with the invention, the container body is formed so that at least part of the base will rest on a flat surface, thereby supporting the utensil. The yolk retention portion and the white retention portion may be formed so that the base of each such portion is at the same height above the turntable or other base of the microwave oven. In those embodiments where at least one projection defines the yolk retention portion, the base of the yolk retention portion and the base of the white retention portion preferably both rest simultaneously on the turntable or oven base. However, in this embodiment of the invention, the yolk retention portion may be higher than the white retention portion so that only the latter portion supports the container body on the turntable or oven base. In the embodiments where the yolk retention portion is formed simply by a flat central portion of the base, the container body will be supported by this central portion.

As indicated above, the side walls of the container body may merge at an angle with the base of the container body or the side walls may merge with the base in a smooth continuous curve. Where the side walls extend at an angle to the base, it will be readily appreciated that the more obtuse the angle between the side wall and the base, the greater the ability of the white to spread away from the yolk. Where the side walls merge with the base in a smooth continuous curve, it is still possible to vary the "angle" between the base and the side walls by varying the radius or radii of curvature.

For any particular diameter of container body, varying the angle at which the side walls merge with the base allows a variation in the extent of relative cooking of the yolk and white. If the base of the container body is relatively flat and the side walls extend substantially perpendicular to the base, there will be a tendency for the part of the white closest to the yolk to be insufficiently cooked when the remainder of the white, and the yolk, are at the desired edible consistency. This tendency can be countered by introducing a rake to the side wall of the container body, thereby allowing increased microwave access to the white closer to the yolk, without permitting direct access of the microwaves to the yolk.

Increasing the diameter of the base for a given wall angle allows the white to spread away from the yolk to a greater extent, in a similar way as making the angle between the walls and the base more obtuse for a given base diameter. As the diameter of the container body is a fundamental factor in determining the height and width of the white around the yolk, there will be an optimum range of diameter to achieve a satisfactory cooking balance.

It has been found that the relative height of the white and yolk is an important factor in achieving the desired cooking balance. Accordingly, as the utensils of this invention not only provide a means which holds the egg yolk in the centre of the base of the container body, but also require that substantially all microwave radiation first entering the yolk of an egg in the container body after passage through the egg white will previously have passed through the sides or base of the container body, the utensils can be designed to provide better control over the relative cooking of the white and yolk.

Preferably the diameter of the container body is such as to allow the white to extend at least three-quarters of the yolk height. The diameter is preferably not less than that which allows the white to extend any substantial distance above the top of the yolk. In other words, the diameter of the container body is most preferably such that only the upper quarter of the yolk height may be exposed above the white and that the top of the yolk will not be substantially below the upper surface of the white.

In one preferred form of the invention, the cooking utensil will include only one container body. If more than one container body is formed in a utensil, the side walls of each container body must be spaced from adjacent container bodies to allow microwave access, at a similar strength level, around each such body.

Utensils of the present invention may include a cover portion constructed to mate with the (or each) container body. A cover portion is preferably nestable at the free edge of the container side wall and the nesting arrangement may include provision for the escape of gas from the interior of the closed utensil. The cover portion may simply be of a suitable form to reduce the escape of steam when it closes the container body. Preferably however, the cover portion is also in the form of a container body which is inverted in sue to form the utensil cover portion. In this embodiment of the invention, the cover portion is preferably in the form of a container body in which the design parameters have been altered to allow the production of a firmer or softer cooked egg than the container body with which the cover portion is adapted to mate.

A cover portion which is not formed to act as a container body when inverted may be constructed from microwave reflective material, thereby enabling the cover portion to shield the upper portion of an egg within its associated container body. This alternative provides a further variable in the design parameters of utensils made in accordance with the present invention.

The container bodies of the invention will be formed of appropriate microwave transmissable material, for example polypropylene. The container bodies may be formed integrally with, or otherwise associated with, ancillary features such as handles enabling the convenient use of the utensils concerned.

Reference is now made to the accompanying drawings which illustrate schematically various alternative forms which features of the present invention may take. These drawings are given by way of illustration only and are not to be construed as limiting the scope of the invention as described above.

Figure 1:
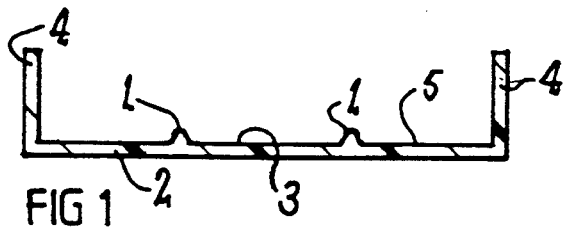
FIGS. 1 to 5 illustrate cross sections taken through the centre of alternative utensil container bodies constructed in accordance with the present invention.
Figure 2:
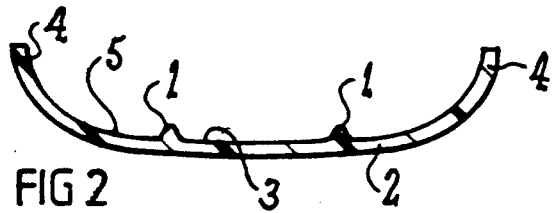

In FIGS. 1 to 4 of the drawings, projections 1 rise from container base 2 (and 2'). Projections 1 enclose or substantially enclose yolk retention portion 3 and, with side walls 4, define surrounding white retention portion 5.

Figure 3:
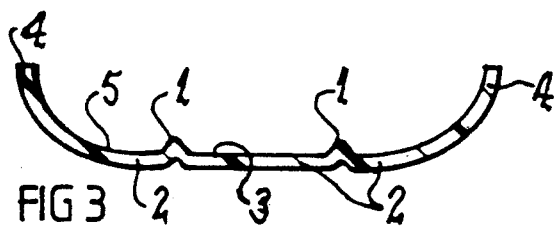
Figure 4:
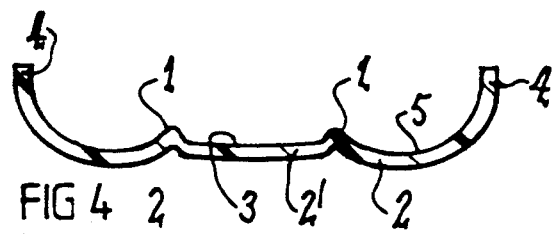

In the embodiment of FIG. 3, the base 2 of yolk retention portion 3 and the base of white retention portion 5 are co planar so that this container body is supported on a flat surface such as a turn table or base of a microwave oven over substantially all of base 2. In the embodiment of FIG. 4, the base 2' of the yolk retention portion 3 is higher than the base 2 of the white retention portion 5 so that the container body of this embodiment is supported on a flat surface only by base 2.

Figure 5:
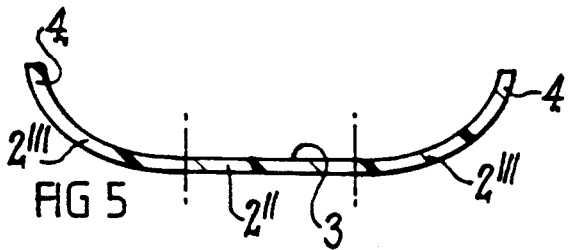

In the embodiment of FIG. 5, yolk retention portion 3 is formed from the flat base portion 2". The remainder of the base, portion 2''' merges with side wall 4.

The microwaves which heat food in a microwave oven are transmitted into the generally roughly cubic interior of the oven. The microwaves are reflected from the walls, roof and bottom of the oven and their distribution within the oven space can be modified by directing the incoming microwaves at the blades of a rotating "fan". However, if a flat-bottomed food container is placed on the bottom of the oven, or on a turntable at the bottom of the oven, considerably less microwaves can enter the food in the container through that part of the container resting on the oven bottom or turntable. We have established that this combination of factors exaggerates the so-called "edge effect" of microwave cooking as the majority of the microwave energy enters the food substantially laterally. Accordingly we have found that be regulation of these lateral sources of energy in relation to the food to be cooked, we can obtain increased control of the manner in which the different parts of the food are cooked.

Consideration of FIGS. 1 to 5 will thus make clear that the container body constructions of the present invention will prevent substantially all microwaves which do not enter the egg yolk from above, from entering the yolk until they have passed through portion of the egg white which surrounds the sides of the centrally held yolk.

Figure 6:
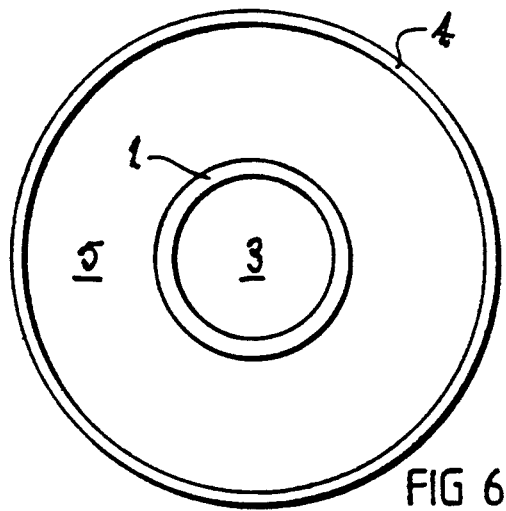
FIGS. 6 to 9 are plan views illustrating alternative forms of container body construction.
Figure 7:
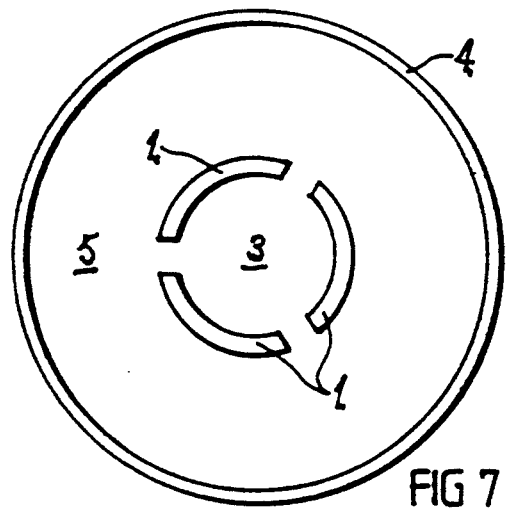
Figure 9:
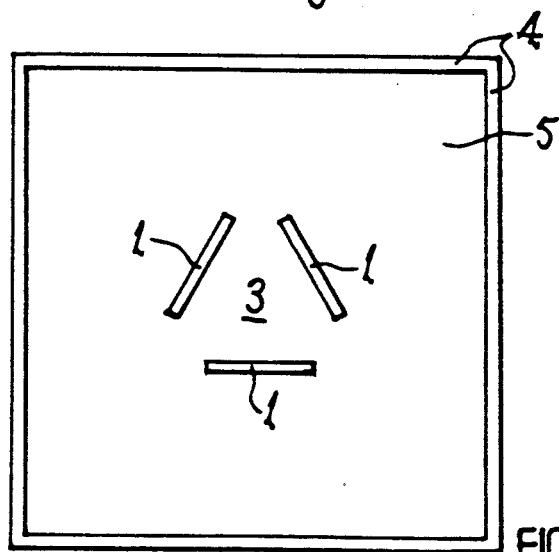
Figure 8:
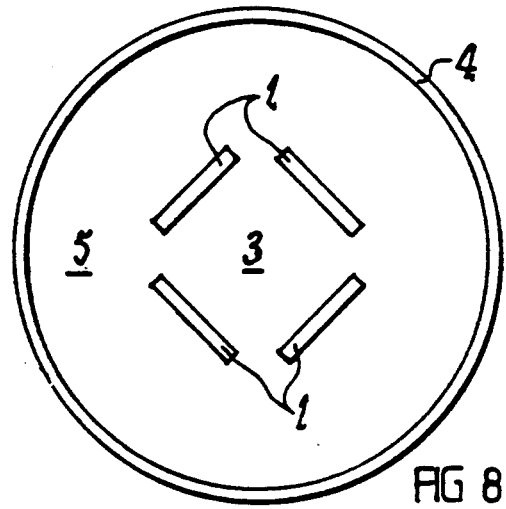

The circular plan of FIGS. 6 to 8 is generally preferred with the continuous projection 1 of FIG. 6 being particularly preferred. However, FIGS. 7, 8 and 9 show discontinuous projections 1 which are spaced to prevent an egg yolk in yolk retention portion 5. The form of container body shown in FIG. 9 may be used to produce a cooked egg of novel appearance with a substantially square-edged white portion surrounding a roughly triangular yolk portion, both yolk and white being cooked to a similar consistency.

The construction of utensils in accordance with the present invention enables the microwave cooking of eggs to give reasonably consistent results, provided the other parameters, such as time and microwave power, affecting the cooking process are constant. Using the design principles of the present invention, utensils for the microwave cooking of eggs can be constructed to provide the degree of cooking of both yolk and egg white which will suit the preferences of individual consumers. In particular the constructions of the present invention enable the microwave cooking of eggs to provide a cooked product having a soft to runny yolk with a firm but not over- or under-cooked egg white. Cooking utensils constructed in accordance with the principles of the present invention may reduce the possibility of violently rupturing the yolk membrane during the cooking process if this membrane is not broken before or after the egg is within the container body.

I claim:

1. A microwave egg cooking utensil, comprising:
   a container body of microwave transmissible material, said body including a side wall and a base for supporting said utensil when resting on a flat surface;
   said side wall merging with said base and being of sufficient height to restrain and mold a shelled egg;
   said base including at least one projection centrally disposed thereon to form a yolk retention portion;
   said base forming with said side wall a white retention portion surrounding said yolk retention portion, and wherein said projection being of sufficient height to hold the yolk within said yolk retention portion and having a height which is less than the height of the yolk.

2. A utensil as claimed in claim 1 wherein the base has a substantially flat central portion and the remainder of the base and the side walls extend upwardly from this flat central portion, the flat central portion alone constituting the yolk retention portion of the container body.

3. A utensil as claimed in claim 1 wherein the projection height is not greater than three eighths of the height of the yolk from the lowest portion of the yolk within the yolk retention portion.

4. A utensil as claimed in claim 1 wherein the base within the projection forms a concave yolk retention portion while the base outside the projection forms a dished annular white retention portion.

5. A utensil as claimed in claim 4 wherein both the base within the projection and the base outside the projection are adapted to rest simultaneously on a flat surface.

6. A utensil as claimed in claim 4 wherein the white retention portion is adapted to rest on a flat surface with the yolk retention portion elevated above this surface.

7. A utensil as claimed in claim 1 wherein the side wall is formed by the merger of a plurality of adjacent walls.

8. A utensil as claimed in claim 1 wherein the side wall is in the form of a substantially continuous circle and merges in a smooth continuous curve with the base.

9. A utensil as claimed in claim 1 including a complementary cover portion for the container body which, when inverted from its cover position itself constitutes a container body.

* * * * *